Figure 1:
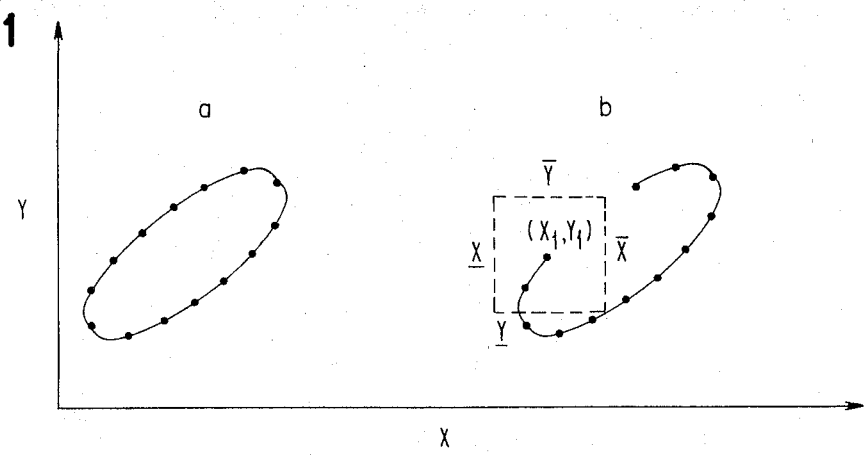
Figure 2:
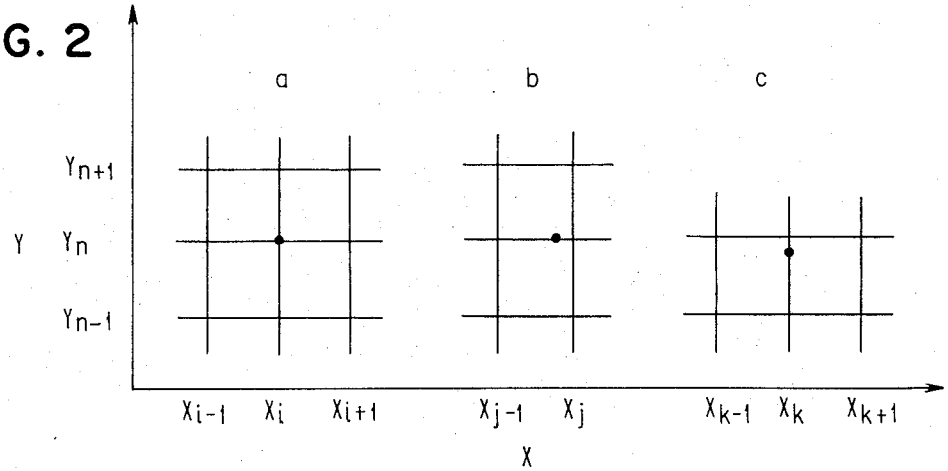
Figure 3:
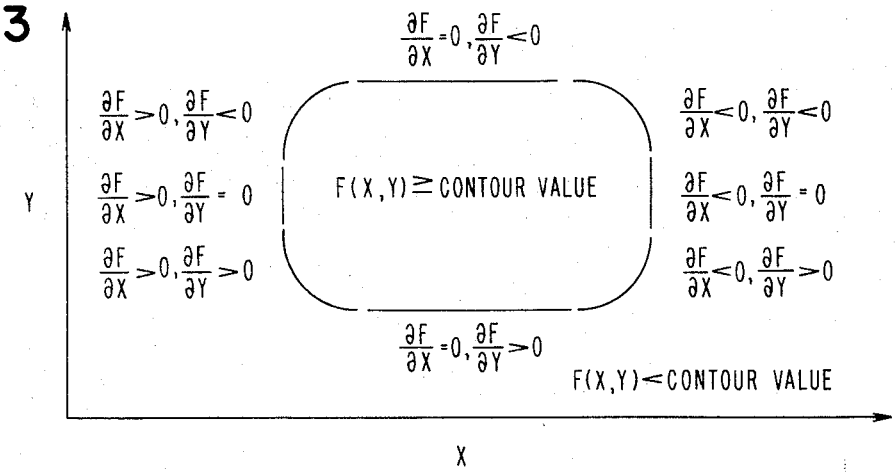
Figure 4:
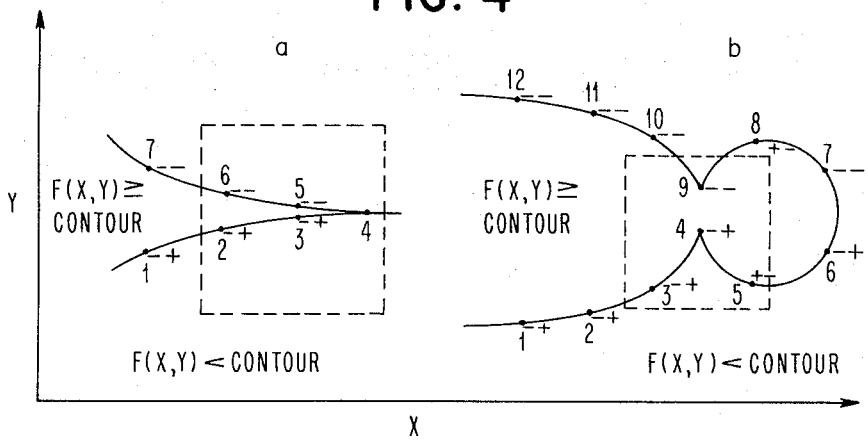
Figure 5:
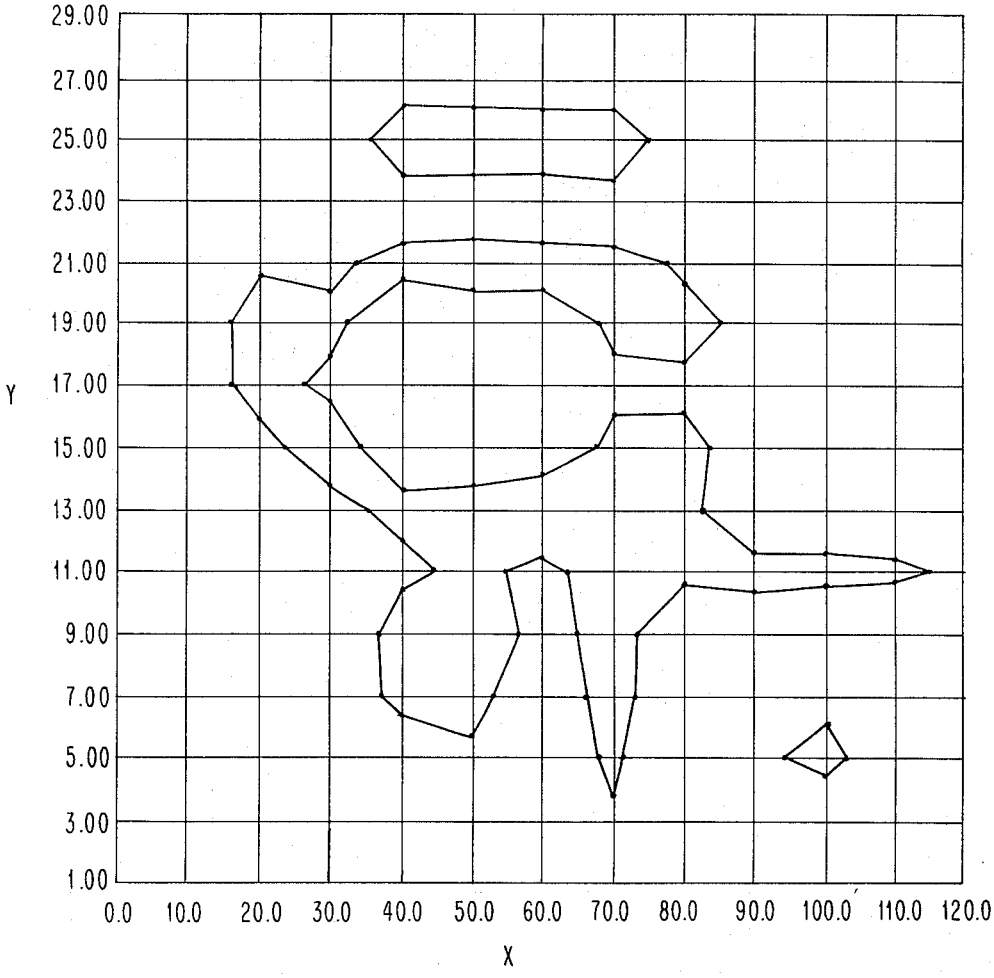
Figure 6A:
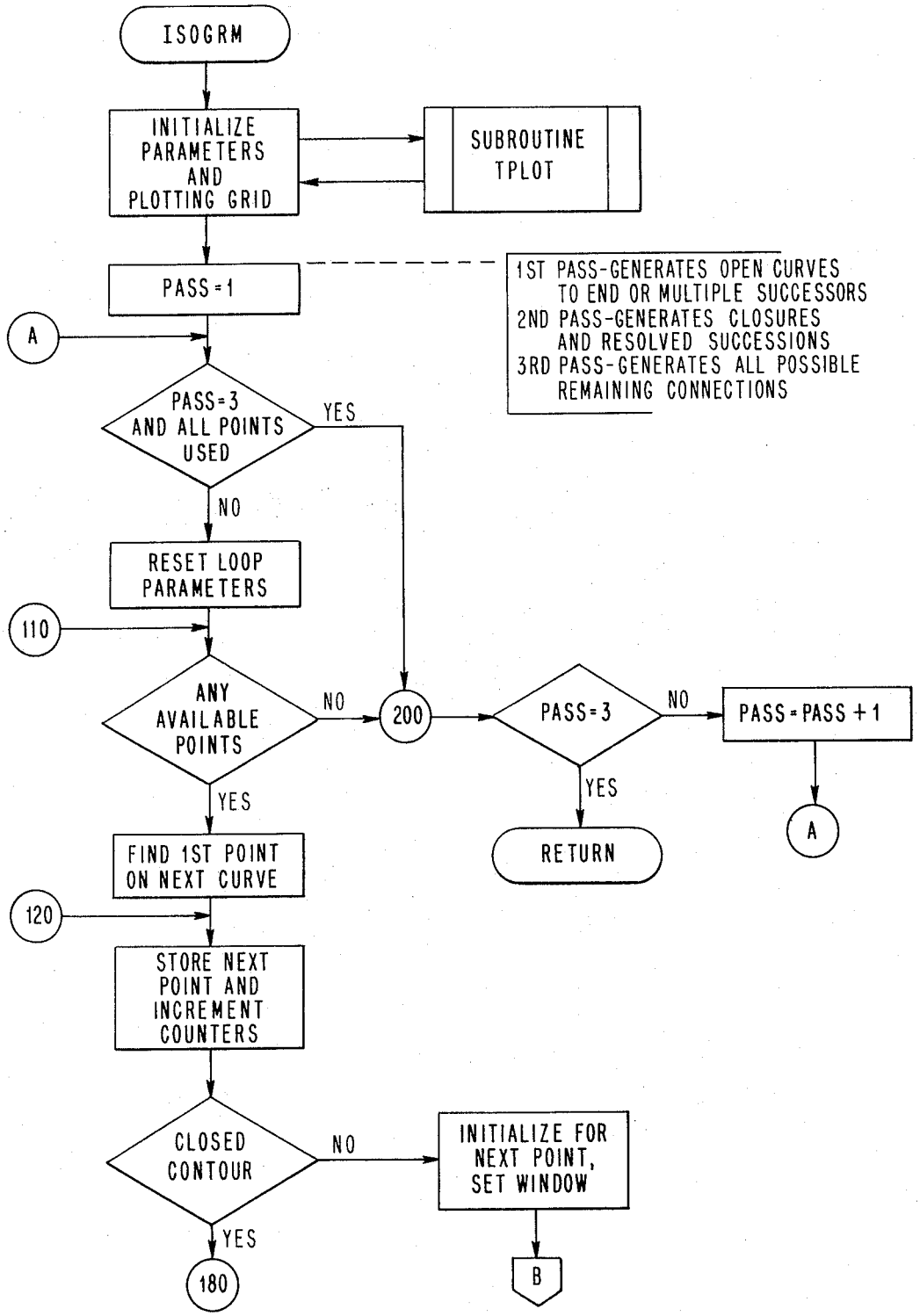
Figure 6B:
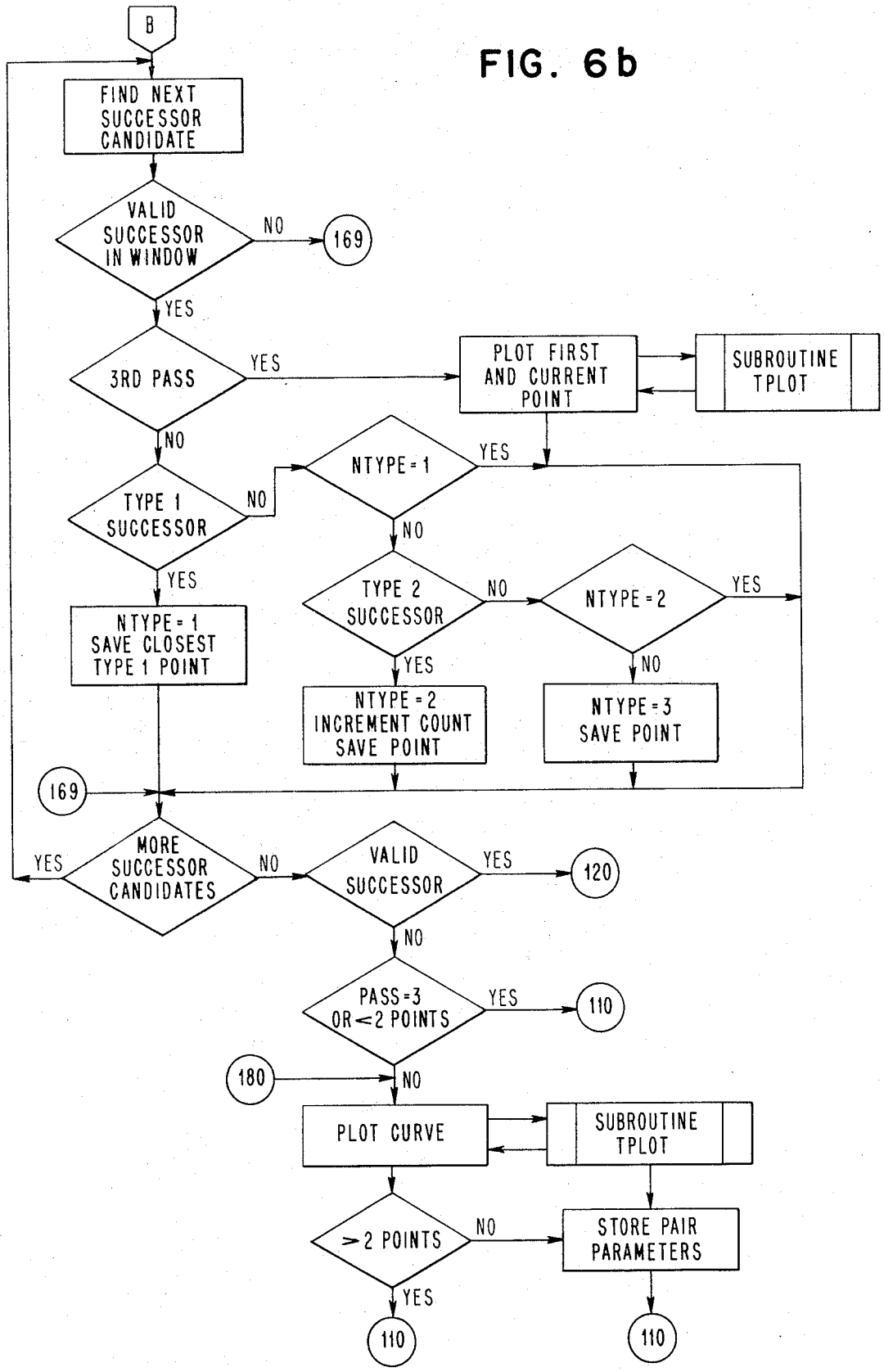

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 9, 1973

915 O.G. 384

T915,006

COORDINATE-ORDERING FOR CONTOUR PLOTTING

Paul Arnold Friedman, Morristown, N.J., assignor to International Business Machines Corporation, Armonk, N.Y.

Continuation of abandoned application Ser. No. 213,078, Dec. 28, 1971. This application Feb. 9, 1973, Ser. No. 331,143

Int. Cl. G06f *15/20*

U.S. Cl. 444—1

4 Sheets Drawing. 34 Pages Specification

A computer program to derive and control plotting of contour representing lines of constant values within a linear, 2-dimensional matrix. The program uses an algorithm which orders coordinate of points on a contour, enabling continuous progressions along the contour. The basic steps within the contour ordering algorithm may be defined as:

(1) determination of available points as potential candidates;

(2) use of a search window to discard points too remote to be a valid successor candidate;

(3) classifying successor candidates to enable selection of the best one as the valid successor; and

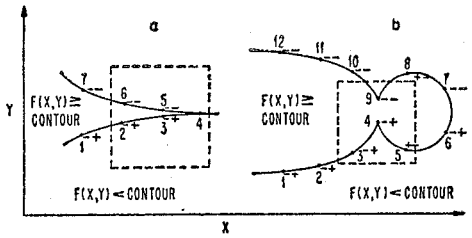

(4) when no successor candidates are found or selection of the best one cannot be made, the contour segment is processed or stored, and the algorithm proceed to the next available starting point.

The program can be used to determine closure and discrete contours in a single or multiple contour environment, with particular application to plotting and analysis. The invention herein described was made in the course of or under a contract or subcontract thereunder with the Department of the Army.

COORDINATE-ORDERING FOR CONTOUR PLOTTING

Original Filed Dec. 28, 1971 4 Sheets-Sheet 1

COORDINATE-ORDERING FOR CONTOUR PLOTTING

Original Filed Dec. 28, 1971 4 Sheets-Sheet 2

COORDINATE-ORDERING FOR CONTOUR PLOTTING

Original Filed Dec. 28, 1971 4 Sheets-Sheet 3

COORDINATE-ORDERING FOR CONTOUR PLOTTING

Original Filed Dec. 28, 1971 4 Sheets-Sheet 4